(12) United States Patent
Segawa et al.

(10) Patent No.: US 7,340,079 B2
(45) Date of Patent: Mar. 4, 2008

(54) IMAGE RECOGNITION APPARATUS, IMAGE RECOGNITION PROCESSING METHOD, AND IMAGE RECOGNITION PROGRAM

(75) Inventors: Machiko Segawa, Tokyo (JP); Hiroshi Goto, Kanagawa (JP); Toshihiro Watanabe, Tokyo (JP); Zhao Wenwu, Tokyo (JP); Makoto Murata, Tokyo (JP); Keigo Ihara, Tokyo (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 10/660,641

(22) Filed: Sep. 12, 2003

(65) Prior Publication Data

US 2004/0109587 A1    Jun. 10, 2004

(30) Foreign Application Priority Data

Sep. 13, 2002    (JP) .............................. 2002-267595

(51) Int. Cl.
*G06K 9/00* (2006.01)
*G05B 19/00* (2006.01)
*H04K 1/00* (2006.01)

(52) U.S. Cl. ..................... 382/118; 382/181; 340/5.53; 713/186

(58) Field of Classification Search ........ 382/115–127, 382/181; 340/5.1, 5.2, 5.52, 5.53; 902/3; 713/186
See application file for complete search history.

(56) References Cited

U.S. PATENT DOCUMENTS 6,188,777 B1 *   2/2001   Darrell et al. .............. 382/103
6,549,913 B1 *   4/2003   Murakawa ................ 707/104.1
6,570,498 B1 *   5/2003   Frost et al. ................ 340/540
7,035,440 B2 *   4/2006   Kaku ......................... 382/115
7,177,450 B2 *   2/2007   Tajima ....................... 382/118

* cited by examiner

Primary Examiner—Aaron W Carter
(74) Attorney, Agent, or Firm—Oblon, Spivak, McClelland, Maier & Neustadt, P.C.

(57) ABSTRACT

An image recognition apparatus, method and program capable of discriminatively recognizing an object at an enhanced recognition rate despite an increase in the total number of reference images registered in image databases. When any individual person or public corporation for example is to be specified from the object image obtained by shooting the person or the like, one image database of the attribute corresponding to various situations, or familiarity to the object image is selected automatically, and then the person or corporation is specified from the shot image while referring to the reference images stored in the image database of the selected attribute. Therefore, even if the sum of the reference images is increased, since they are subdivided and classified corresponding to the attributes, the number of the reference images for each attribute can be reduced, and further the image database of the optimal attribute can be selected automatically in conformity to the situation of recognition such as date, time and so on. Thus, the number of the reference images can be minimized without the user's intentional manipulation, and the reference images are narrowed down due to the additional information of the situation.

25 Claims, 12 Drawing Sheets

FDB — FAMILIARITY DB

| ID | FAMILIARITY R (0.0–1.0) | NUMBER OF RECOGNITIONS N | OCCUPANCY AREA RATIO M/Mfull (FACE IMEGE TO ENTIRE REGION Mfull) (%) |
|---|---|---|---|
| 1 | 0.2 | 2 | 40 |
| 2 | 0.4 | 4 | 60 |
| ... | | | |
| 11 | 0.8 | | |
| 12 | 0.6 | 10 (=Nmax) | |
| ... | | | |

- FACE REGION LARGE→DISTANCE SHORT
  →FAMILIARITY HIGH (a)

- FACE REGION SMALL→DISTANCE LONG
  →FAMILIARITY LOW (b)

(a) · WHEN FAMILIARITY IS HIGH (b) · WHEN FAMILIARITY IS LOW

IMAGE RECOGNITION APPARATUS, IMAGE RECOGNITION PROCESSING METHOD, AND IMAGE RECOGNITION PROGRAM

BACKGROUND OF THE INVENTION

The present invention relates to an image recognition apparatus, an image recognition processing method and an image recognition program for discriminatively recognizing and identifying any individual person or public corporation from an object image thereof obtained by shooting a person or a logo mark put up in a store or the like.

The technology of face recognition to identify an individual person by discriminatively recognizing his or her face shot by a camera is adopted in a field of security to identify or authenticate an individual person, and it is also utilized in a human interface of a pet robot having an appearance and shape modeled on some animal such as a dog for example.

However, in the known face recognition technology described above, there arises a problem that, if the number of samples of reference images registered previously in databases for storage and management of the registered face image data becomes great, some erroneous recognition is liable to occur due to the resultant increase of similar faces to consequently bring about deterioration of the recognition rate.

SUMMARY OF THE INVENTION

The present invention has been accomplished in view of the circumstances mentioned above. And it is an object of the invention to provide improvements in an image recognition apparatus, an image recognition method and an image recognition program which are capable of enhancing the recognition rate despite any increase in the number of reference image samples registered in databases.

According to a first aspect of the present invention, there is provided an image recognition apparatus including: a shooting element for shooting an object image to be discriminatively recognized and identified; a plurality of attribute-classified image database element classified respectively in accordance with a plurality of attributes corresponding to various situations of the shooting performed by the shooting element, and storing therein reference images classified into the attributes and also storing recognition ID attached uniquely to the reference images respectively; a selection element for selecting, from the plurality of attribute-classified image database element, one image database element of the attribute corresponding to the present situation of the face recognition; and an object specifying element for specifying the recognition ID, which corresponds to the object image shot by the shooting element, with reference to the reference image stored in the attribute-classified image database element selected by the selection element.

According to a second aspect of the present invention, there is provided an image recognition processing method including: a selection step of selecting one attribute-classified image database corresponding to the present situation of recognition from a plurality of attribute-classified image databases which store therein attribute-classified reference images classified respectively in accordance with a plurality of attributes corresponding to various situations of the shooting executed by a shooting element to shoot an object image to be discriminatively recognized and identified, and also store therein recognition ID attached uniquely to the reference images respectively; and an object specifying step of specifying the recognition ID, which corresponds to the object image shot by the shooting element, with reference to the reference image stored in the attribute-classified image database selected at the selection step.

And according to a third aspect of the present invention, there is provided an image recognition program including: a selection step of selecting one attribute-classified image database corresponding to the present situation of recognition from a plurality of attribute-classified image databases which store therein attribute-classified reference images classified respectively in accordance with a plurality of attributes corresponding to various situations of the shooting executed by a shooting element to shoot an object image to be discriminatively recognized and identified, and also store therein recognition ID attached uniquely to the reference images respectively; and an object specifying step of specifying the recognition ID, which corresponds to the object image shot by the shooting element, with reference to the reference image stored in the attribute-classified image database selected at the selection step.

Thus, in the present invention, there are provided a plurality of image databases which are classified in accordance with a plurality of attributes corresponding to the situations of face recognition such as date, time or familiarity and store therein the reference images included in such attributes. And when any individual person or public corporation is to be specified from the object image obtained by shooting the person or a logo mark put up in a store or the like, one image database of the attribute corresponding to the situation of the recognition is selected automatically from the plurality of image databases, and then the person or corporation is specified from the shot image with reference to the reference images stored in the image database of the selected attributes.

Therefore, even in case the samples of the reference images registered in the databases are many, since the image databases are subdivided in accordance with the attributes, the number of the reference image samples registered in each image database corresponding to one attribute can be reduced, and further the recognition is performed on the basis of the result obtained by automatically selecting the image database of the attribute corresponding to the situation of the recognition, hence achieving an enhancement in the recognition rate.

The above and other features and advantages of the present invention will become apparent from the following description which will be given with reference to the illustrative accompanying drawings.

DETAILED DESCRIPTION OF THE PREFERRED EMBODIMENTS

Hereinafter a preferred embodiment of the present invention will be described in detail with reference to the accompanying drawings.

(1) Outline

Figure 1A:
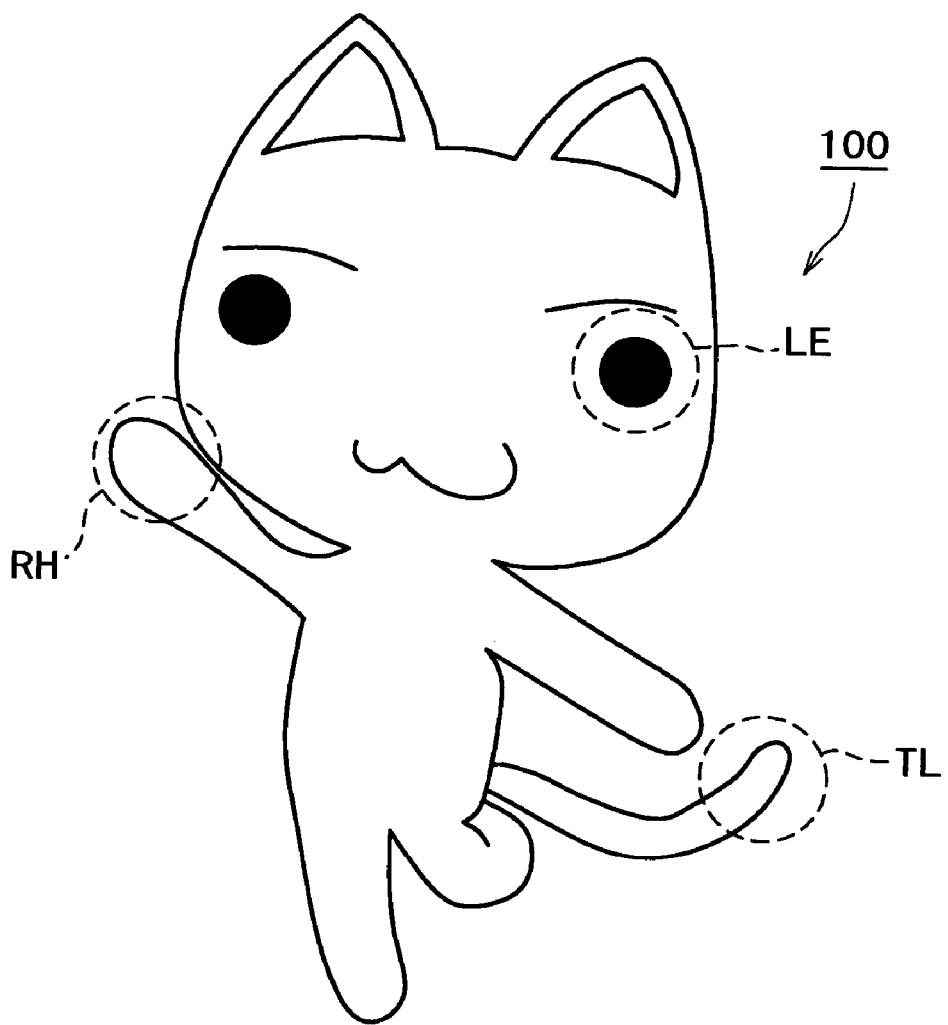
FIGS. 1A to 1C are exterior views each showing an outward appearance and an operation mode of a stuffed toy which represents an embodiment of the present invention.
Figure 1B:
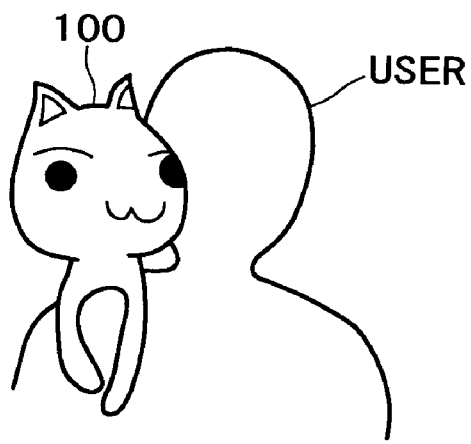

FIG. 1A is an exterior view showing an outward appearance of a stuffed toy 100 which represents an embodiment of the present invention. This stuffed toy 100 is a character doll modeled on a cat, and incorporates a face recognition apparatus 20 (to be described later) therein. The face recognition apparatus 20 operates in a "on-shoulder" mode when the stuffed toy 100 is held on the shoulder of a user (as shown in FIG. 1B), or operates in a "on-lap mode" when the stuffed toy 100 is held on the lap of the user or on the top of a desk, as shown in FIG. 1C.

These modes are automatically changed by an undermentioned mode change switch 9.

In the "on-shoulder mode", there is executed a processing routine of first recognizing the face of a shot image discriminatively to identify a specific person, and informing the user of the person's name in a cat language (mew voice), or registering the face of the shot image as a new face in a database, or recording the shot images sequentially as images to be displayed in an undermentioned album browsing process.

Figure 1C:
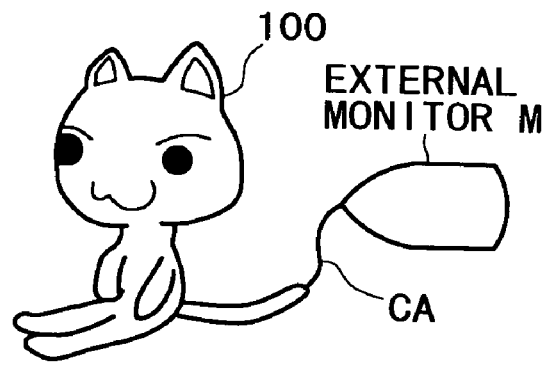

Meanwhile in the "on-lap mode", as shown in FIG. 1C, a cable CA of an external monitor M is connected to an undermentioned video output port 10 provided in a tail of the stuffed toy 100, and a routine is so executed that a series of face images shot in the above-described "on-shoulder mode" are browsed as an album in the external monitor M. The operation performed in each of these modes will be described in detail later.

(2) Structure of Face Recognition Apparatus 20

Figure 2:
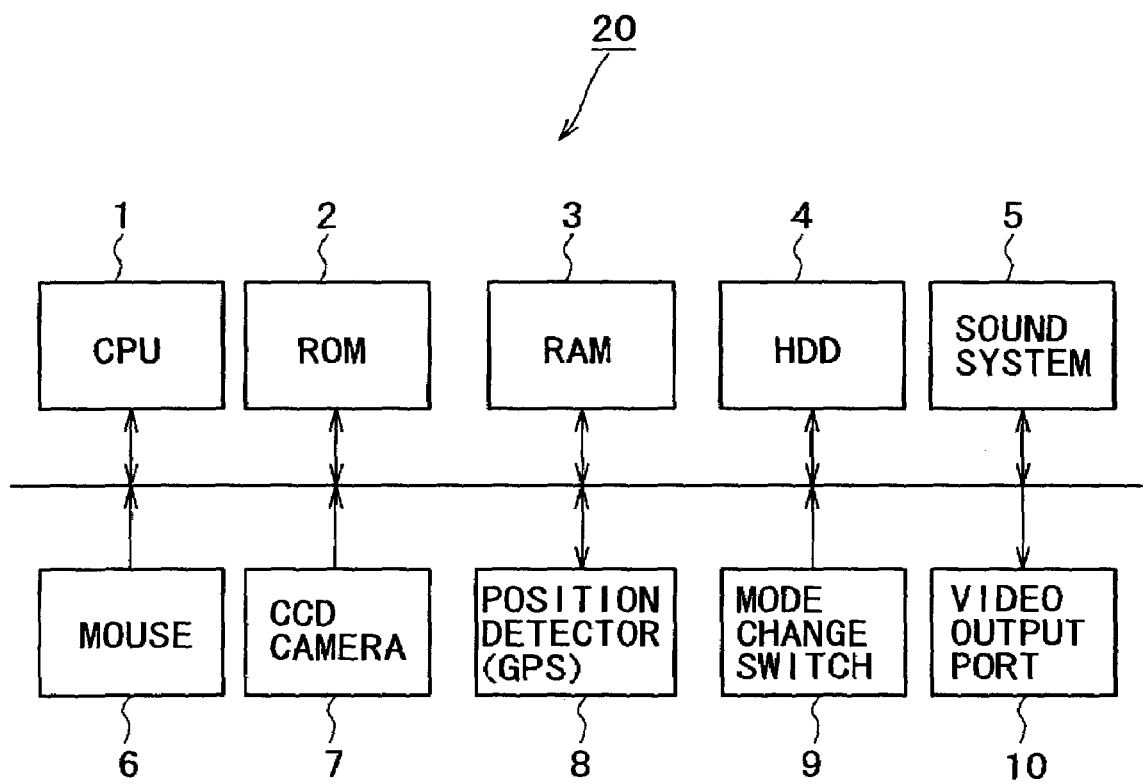
FIG. 2 is a block diagram showing the structure of a face recognition apparatus.

Referring now to FIG. 2, the structure of the face recognition apparatus 20 will be explained below. In FIG. 2, a CPU 1 executes a control program (BIOS) stored in a ROM 2 and, after settling the input/output interface in each section of the apparatus, loads an OS program, which is stored in a HDD 4 (hard disk device), into a RAM 3 to boot the OS (operating system) program. Thereafter the CPU 1 reads out an application program, which is instructed to be executed by a manipulation of the user, from the HDD 4 and then executes this application program after loading the same into the RAM 3.

The application program mentioned above includes a main routine including some processes for "selection of database", "registration of person", "information of name" and so forth.

The RAM 3 has a program area for storing various program data, a work area for temporarily storing the result of the computation obtained from the CPU 1, and an image data area for temporarily storing the images shot by a CCD camera 7. The HDD 4 stores various programs, various databases, table data and audio files.

The various databases stored in the HDD 4 signify a plurality of image databases IDB referred to at the time of face recognition, and a familiarity database FDB. The plural image databases IDB are provided in accordance with a plurality of attributes corresponding to the situation of face recognition and are used to store therein the reference face images of the persons included in the individual attributes.

Figure 3:
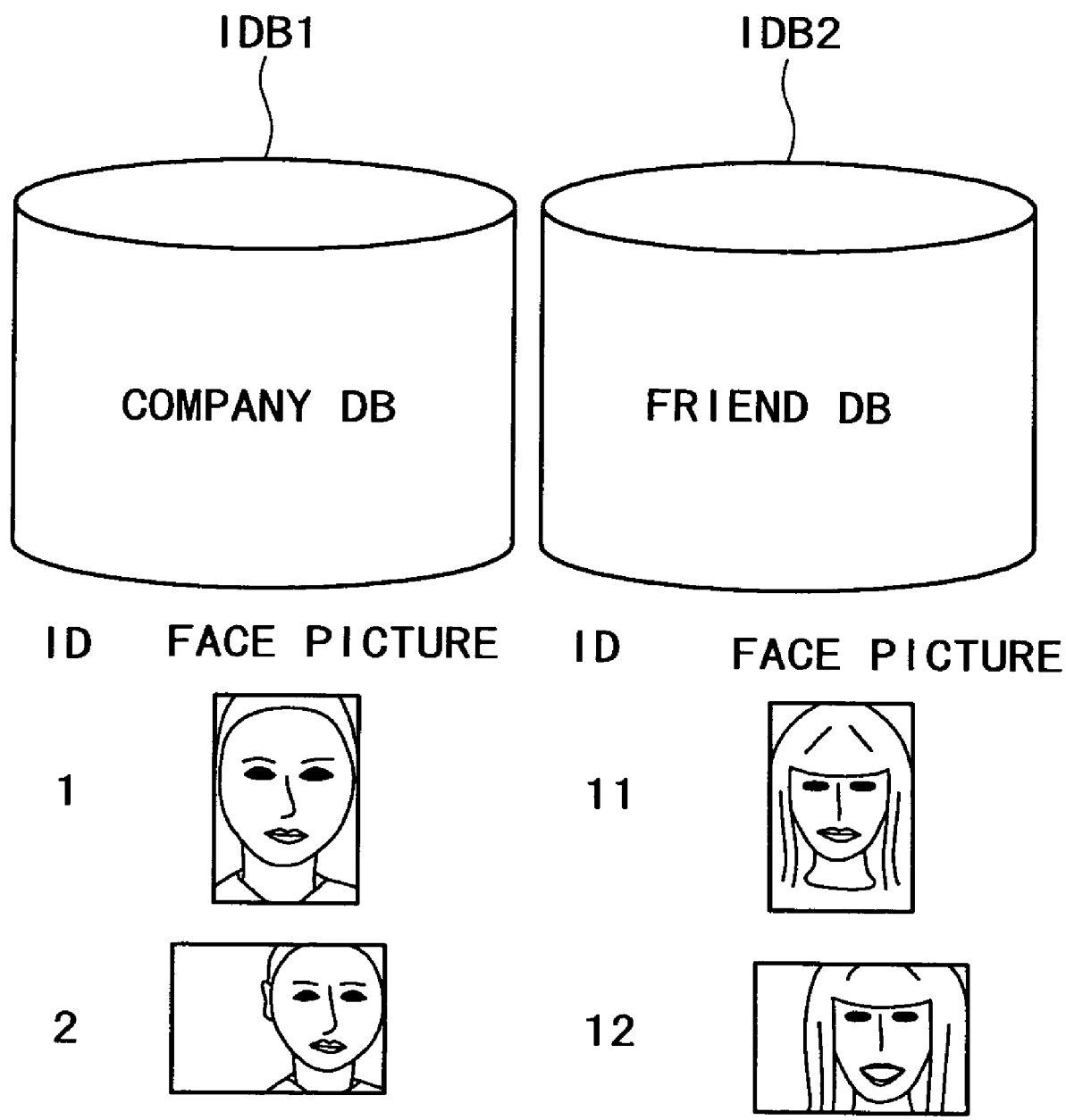
FIG. 3 is a schematic diagram showing the concept of image databases.

More specifically, as shown in FIG. 3 for example, there are known some databases where the reference face images of persons are registered by classifying the human relationship of the user both officially and privately in accordance with the attributes, such as an image database IDB1 containing the registered reference face images of the user's co-workers (superiors, colleagues, subordinates, etc.) in the company where the user works, and an image database IDB2 containing the registered reference face images of the user's friends, acquaintances and so forth.

Any of these image databases IDB is selected automatically according to the situation of face recognition, as will be described later. Each image database IDB stores and manages a plurality of records composed at least of identification ID and the face image data of the persons related correspondingly thereto. In order to avoid a deterioration of the recognition rate, it is preferred to register, per image database, the face image data of ten persons or so.

Figure 4:
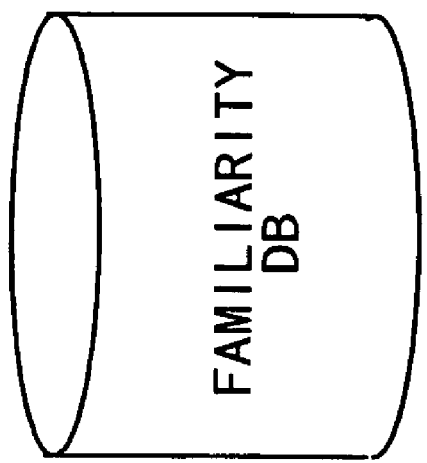
FIG. 4 is a schematic diagram showing the concept of a familiarity database.

The familiarity database FDB signifies a relational database linked to each image database IDB, and it stores and manages the familiarity per recognition ID of the person registered in each image database IDB, and also the occupancy area ratio of the object image to the entire region shot by an undermentioned CCD camera 7, and the number of times of recognition specified as the same object image in the past. An example thereof is shown in FIG. 4.

The familiarity mentioned here is a value determined in accordance with the size of the face region of the face-recognized person and also with the number of times of the recognitions performed. For example, in FIG. 11A where the recognized face region A1 is large and the number of times of the recognition as the same person is great, the familiarity is considered to be high with regard to the user. Meanwhile, in another example of 11B where the recognized face region A2 is small and the number of times of the recognition as the same person is also small, the familiarity is considered to be low with regard to the user.

Now the familiarity defined in the face recognition apparatus 20 will be explained more specifically.

Figure 11A:
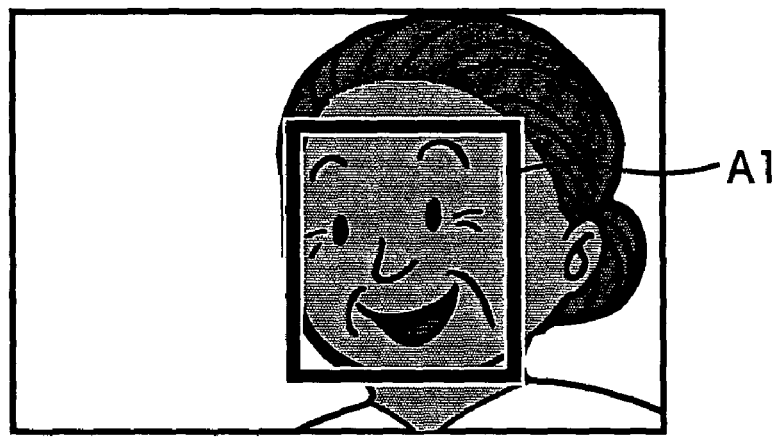
FIGS. 11A and 11B are diagrams for explaining the definition of familiarity.

A face region A1 shown in FIG. 11A is a region calculated at detection of a face according to an undermentioned luminance pattern, and it signifies a rectangular region substantially involving eyes, a nose and a mouth in the face required for specifying an individual person. And a large face region A1 signifies a large occupancy area ratio of the face region A1 (object image) to the entire region being shot. In this case, it is presumed that the distance to the object person is short and the familiarity is higher.

Figure 11B:
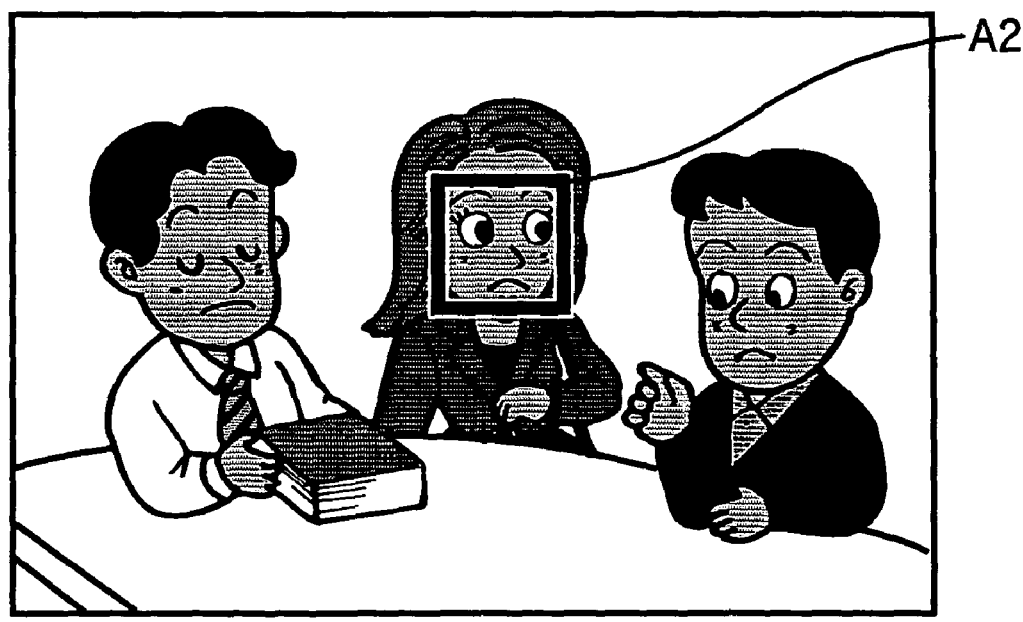

Meanwhile, a small face region A2 shown in FIG. 11B for example signifies a small occupancy area ratio of the face region A2 (object image) to the entire region being shot. In this case, it is presumed that the distance to the object person is long, and the familiarity is lower.

On the basis of such presumption, the familiarity R can be calculated according to, for example, Eq. (1) given below.

$$R = a \times (N/N\text{max}) + (1-a) \times (N\text{area}/N\text{full}) \qquad (1)$$

In the above equation, a stands for a weighting constant set arbitrarily within a range of 0.0 to 1.0; N stands for the number of times of recognition to identify as the same person in the past with regard to the face region A1 being recognized now; Nmax for the maximum value (10 in the example of FIG. 4) in the numbers of times of recognition stored in the familiarity database FDB; Narea for the area of the face region A1 being recognized now; and Nfull for the area of the entire region being shot.

The familiarity R shown in FIG. 4 is calculated according to Eq. (1) given above, and the familiarity database FDB is updated every time a new familiarity R is calculated.

The face region A1 is not limited merely to the rectangular region substantially involving the eyes, nose and mouth on the face, and it is a matter of course to use some other parameter that changes in accordance with the distance to the object person, such as the area of the rectangular region where the face is inscribed.

The table data stored in the HDD 4 signify a database select table DST and a name inform table NIT. The database select table DST contains table data to designate selection of one of the aforementioned plural image databases IDB in accordance with the present date and time and the present position of the user.

In the database select table DST, it is possible for the user to register any desired specific values correspondingly to the present date, time and position. For example, if the date and time are a weekday and daytime respectively and the position is in the company, the user registers a specific value to select the image database IDB1. Meanwhile, if the date is Saturday or Sunday and the present position need not be designated particularly, the user registers a specific value to select the image database IDB2.

The name inform table NIT contains table data where audio files are related correspondingly to the recognition ID of the person identified by the face recognition. This table is used for selecting the audio file corresponding to the recognition ID of the identified person.

A sound system 5 reads out PCM waveform data from the audio file instructed for reproduction by the CPU 1, and emits an audio output after digital-to-analog conversion of the data. A mouse 6 is provided in a right hand RH of the stuffed toy 100 (see FIG. 1), and generates a pointing signal or a switch event in response to a manipulation by the user. A CCD camera 7 is provided in a left eye LE of the stuffed toy 100, and generates image data by shooting the object under control of the CPU 1. A position detector 8 receives a GPS (Global Positioning System) signal under control of the CPU 1 to thereby detect the present position, and generates position data based on the result of such detection.

A mode change switch 9 is provided in a waist portion of the stuffed toy 100, and generates a mode change event in accordance with bend or stretch of the waist. More specifically, when the stuffed toy 100 is held on the user's shoulder as shown in FIG. 1B for example, the switch 9 generates a switch event representing the "on-shoulder" mode. Or, when the stuffed toy 100 is held on the user's lap or on the top of a desk as shown in FIG. 1C, the switch 9 generates a switch event representing the "on-lap" mode. A video output port (VGA connector) 10 is provided in a tail of the stuffed toy 100, and outputs a display control signal.

Any other component elements than the above-described mouse 6, CCD camera 7, mode change switch 9 and video output port 10 are incorporated as the apparatus itself in the body of the stuffed toy 100.

(3) Details of Face Recognition Algorithm

The details of a face recognition algorithm used in the face recognition apparatus 20 mentioned above are disclosed in United States Patent Application Publication No. US 2003/0059092 A1 proposed previously by the present applicant and cited here as a reference.

In the face recognition apparatus 20, the following three techniques are employed to realize face recognition.
(i) Face detection from complex scene
(ii) Real-time face tracking
(iii) Face discrimination The face detection technology may be roughly classified into the techniques of using colors, movements and patterns for discrimination of objects. Of these techniques, the most efficient is the one that uses a face pattern for slicing a face accurately from a complex scene. However, searching for a face of the full scale across the entire scene imposes a severe load and hence this technique has not so far been used except for still images.

On the other hand, the majority of systems for detecting the face in real-time are based on the principle of skin color detection. However, the color is changed depending on the conditions of illumination, and the skin color varies with the race or individual difference, so that the face recognition by merely simple skin color fails to be effective means.

In view of the above problem, there is adopted a technique of real-time face tracking which is based on the distribution of colors contained in the detected face pattern and adapts the face detection to the dynamic changes derived from the tracking. And a search for the face pattern is performed only with regard to the face region obtained from the presumed color distribution, thereby shortening the time of computation in the face detection.

Moreover, the face image sliced by the pattern search is used for face discrimination. And while the tracking is kept successful, the face image is regarded as the result of discrimination of the same face, so that it becomes possible to attain a comprehensive decision from the plural results of discrimination.

In the process for face discrimination, for example, (i) face detection from a complex scene is executed according to face detection (face recognition) by a luminance pattern; (ii) real-time face tracking is executed according to face tracking by color (face tracking); and (iii) face discrimination is executed by discrimination of a person using a differential face.

For example, each of such processes in the face recognition apparatus 20 is implemented as a module or an object. That is, the face recognition apparatus 20 includes a face tracking module, a face detection module and a face discrimination module. In this apparatus, the face tracking module functions as a face tracking means to track a face changing in an image shot by a CCD camera 7; the face detection module functions as a face data detection means to detect face data of a face in an image shot by the CCD camera 7 on the basis of the face tracking information obtained from the face tracking module; and the face discrimination module functions as a face discrimination means to discriminate a specified face on the basis of the face data detected by the face detection module.

In the face detection by luminance patterns, the process of detecting (recognizing) a face from an input image is executed. Specifically, in this face detection, face and non-face discrimination is performed by a support vector machine (SVM). This process is usually characterized by invulnerability to environmental changes, requirement of voluminous calculations, and vulnerability to posture changes. An example of such environmental changes connotes changes in ambient illumination.

In the face tracking by color, the process of tracking a face in an input image is executed. Specifically, in this face tracking, there are performed presumption of the face color distribution and presumption of the face region. This process is usually characterized by vulnerability to environmental changes, requirement of less calculations, and invulnerability to posture changes.

In the personal discrimination, the process of face discrimination is executed by identifying, as a specified face, the face recognized through the aforementioned face detection. More concretely, in this personal discrimination, morphing is performed by identically positioning the eyes and nose, and then the person is identified from the differential face.

In the face discrimination system, the above-mentioned processes are shared adequately by respective steps in the face discrimination in a manner to achieve a relationship of reciprocal complement, hence enabling face detection with high precision. For example, the processes are assigned as follows to attain a relationship of reciprocal complement.

For example, the face tracking by color, which is vulnerable to environmental changes, is complemented by utilizing the feature that the face detection by luminance pattern is invulnerable to environmental changes. Conversely, the face detection by luminance pattern, which requires voluminous calculations and is vulnerable to posture changes, is complemented by utilizing the feature that the face tracking by color requires less calculations and is invulnerable to posture changes.

Briefly, therefore, the following may be said. The face detection, which inherently requires voluminous calculations, is difficult to be performed in real-time. However, the processing load relative to the amount of calculations may be relieved by carrying out the operation in a fixed period at a preset timing. On the other hand, the load is increased if a detection of the face position is executed at each timing from within the input image.

Accordingly, in case the face changes in the input image are tracked in real time by utilizing the process invulnerable to the posture changes and the face detection process is executed only with regard to the presumed face position in the input image, then the face detection becomes possible in a state where the face position has already been specified. That is, if the operation is shared by combining the process, which is rough but quick, with the other process which is highly reliable but slow, then the respective processes are rendered capable of complementing each other in the entire system to consequently realize a concerted real-time face detection.

Thus, a large number of the results of face detection can be acquired in a short period of time, and therefore it becomes possible to accomplish high-precision face identification by executing the face recognition on the basis of the acquired results of face detection and then processing such operations statistically.

By the application of such face identification system, the face recognition apparatus 20 automatically performs the entire processes of finding a human from a scene (face detection process), gazing at the found face (face tracking process), and specifying a person (face identification process) by discriminatively recognizing and identifying the face on the basis of the information obtained from the preceding processes, hence realizing the face discrimination and identification of high reliability.

(4) Operation of Face Recognition Apparatus 20

Next, the operation of the face recognition apparatus 20 having the structure mentioned above will be explained below with reference to FIGS. 5-9. In the following description, first the operation in a main routine will be explained, and then further explanations will be given on the respective operations performed in some processes which constitute the main routine to execute selection of database, registration of person, and information of name.

[1] Operation in Main Routine

Figure 5:
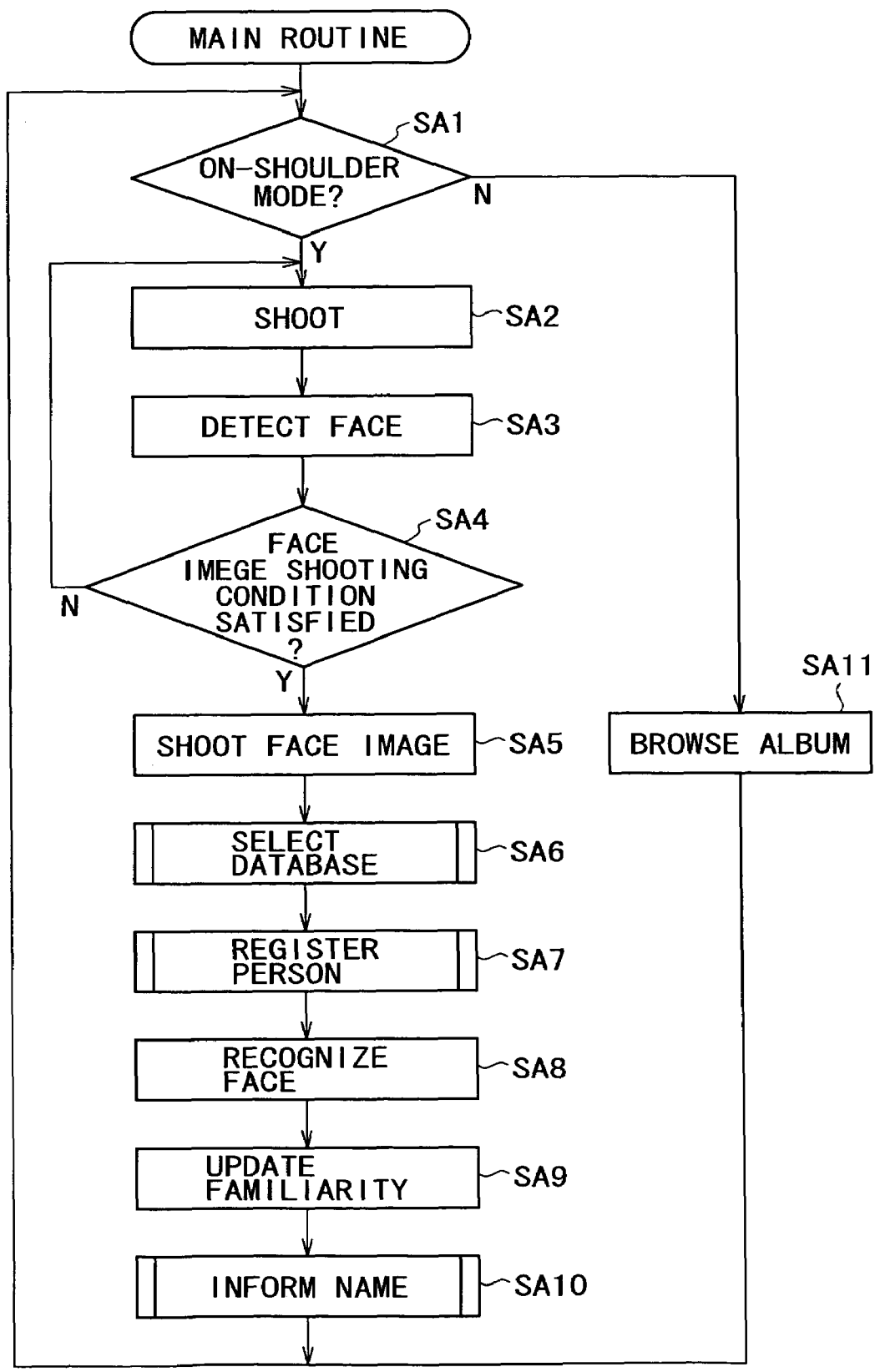
FIG. 5 is a flowchart showing the operation in a main routine.

When the user has switched on the power supply to execute the main routine shown in FIG. 5, the operation of the face recognition apparatus 20 proceeds to step SA1, where a decision is made as to whether the apparatus is in the "on-shoulder mode" or not. In case the stuffed toy 100 is held on the user's shoulder as shown in FIG. 1B, the mode change switch 9 generates a switch event representing the "on-shoulder mode", so that the result of this decision becomes "YES", and then the operation proceeds to step SA2.

At step SA2, the CCD camera 7 is instructed to execute shooting. And at subsequent step SA3, a gradation pattern corresponding to the face of the person is recognized from the shot image, whereby the face is detected. Next at step SA4, a decision is made as to whether the face image shooting condition (person shooting condition) is satisfied or not, i.e., whether the face region detected from the previously shot image is larger than a predetermined size or not. More specifically, a decision is made as to whether the occupancy area ratio calculated as a rate of the face region A1 (object image) to the entire region of the shot image is greater than a predetermined value or not.

If the face region detected from the shot image is not larger than a predetermined size, the shooting condition is considered to be not satisfied and therefore the result of this decision becomes "NO", so that the operation returns to step SA2. Thereafter the foregoing steps of shooting and face detection are repeated until the face region detected from the shot image exceeds the predetermined size.

When the face region detected from the shot image has exceeded the predetermined size to thereby satisfy the shooting condition, the result of the decision obtained at step SA4 becomes "YES", and then the CCD camera 7 is instructed to execute shooting for acquiring the face image. The face image data thus acquired is stored temporarily in the image data area of the RAM 3.

At step SA4 in the above example, the shooting condition is judged on the basis of whether the face region detected from the shot image is larger or not than a predetermined size. However, the condition is not limited to this example alone, and the mode may be so modified that the face image of an object person is shot after the lapse of a fixed time from detection of the face.

After such acquisition of the face image data, the operation of the face recognition apparatus 20 proceeds to step SA6 where a process of database selection is executed. In the database selection, one image database of the attribute optimal to the situation of the face recognition is selected from the plural image databases stored in the HDD 4, i.e., from the image databases containing the registered face images of the persons included in the attributes which classify the human relationship of the user both officially and privately. More concretely, one relevant image database is selected from the aforementioned database select table DST in accordance with the present date and time and the present position of the user.

Subsequently at step SA7, a process of person registration is executed in case the user has clicked the right button of the mouse 6 provided in the right hand RH of the stuffed toy 100 to thereby generate a registration instruct event. In this process, a recognition ID is attached to the face image data obtained by shooting at step SA5, and the new face image data is registered in the image database selected at step SA6, or an audio file corresponding to the new recognition ID is assigned to the name inform table NIT.

At step SA8, there is executed a process of face recognition wherein each of difference values is calculated respectively with respect to the registered face image data of each person in the image database selected at step SA6 and the face image data obtained newly by the shooting, and the individual person corresponding to the registered face image data of the minimum difference value is identified as the person in the shot image.

Thereafter at step SA9, the content of the aforementioned familiarity database FDB is updated on the basis of the result of such face recognition. That is, the familiarity corresponding to the recognition ID of the person identified by the face recognition is updated in accordance with the number of times of the recognition and the size of the face region. Also at this step SA9, the face image data obtained after completion of the face recognition is read out from the image data area of the RAM 3 and then is stored in the album folder of the HDD 4.

The mode of updating the familiarity is not limited to the above example at step SA9, and it may be so modified as to adopt a concept of time also. That is, in the familiarity database FDB shown in FIG. 4, the date and time of the face recognition are also stored and managed as a database item, and a recognition interval is calculated from the date and time of the preceding face recognition and the date and time of the present face recognition. Then, the familiarity may be raised if the recognition interval is short, or the familiarity may be lowered if the recognition interval is long.

Next at step SA10, a name informing process is executed when the user has clicked the left button of the mouse 6 provided in the right hand RH of the stuffed toy 100 to thereby generate a name information instruct event. In this process, the audio file corresponding to the recognition ID of the person identified by the face recognition is selected with reference to the name inform table NIT, and the selected audio file is reproduced.

Thereafter the operation returns to the aforementioned step SA1 and, in a state where the stuffed toy 100 is held on the user's shoulder, the on-shoulder mode operation consisting of steps SA2-SA10 is repeated.

When the stuffed toy 100 is held on the user's lap or on a desk in a state where, as shown in FIG. 1C, the video output port (VGA connector) 10 provided in the tail of the stuffed toy 100 is connected to the cable CA of the external monitor M, the mode change switch 9 generates a switch event representing the "on-lap mode", so that the result of the decision at step SA2 becomes "NO". Consequently, the operation proceeds to step SA11 to execute an album browsing process.

Figure 6:
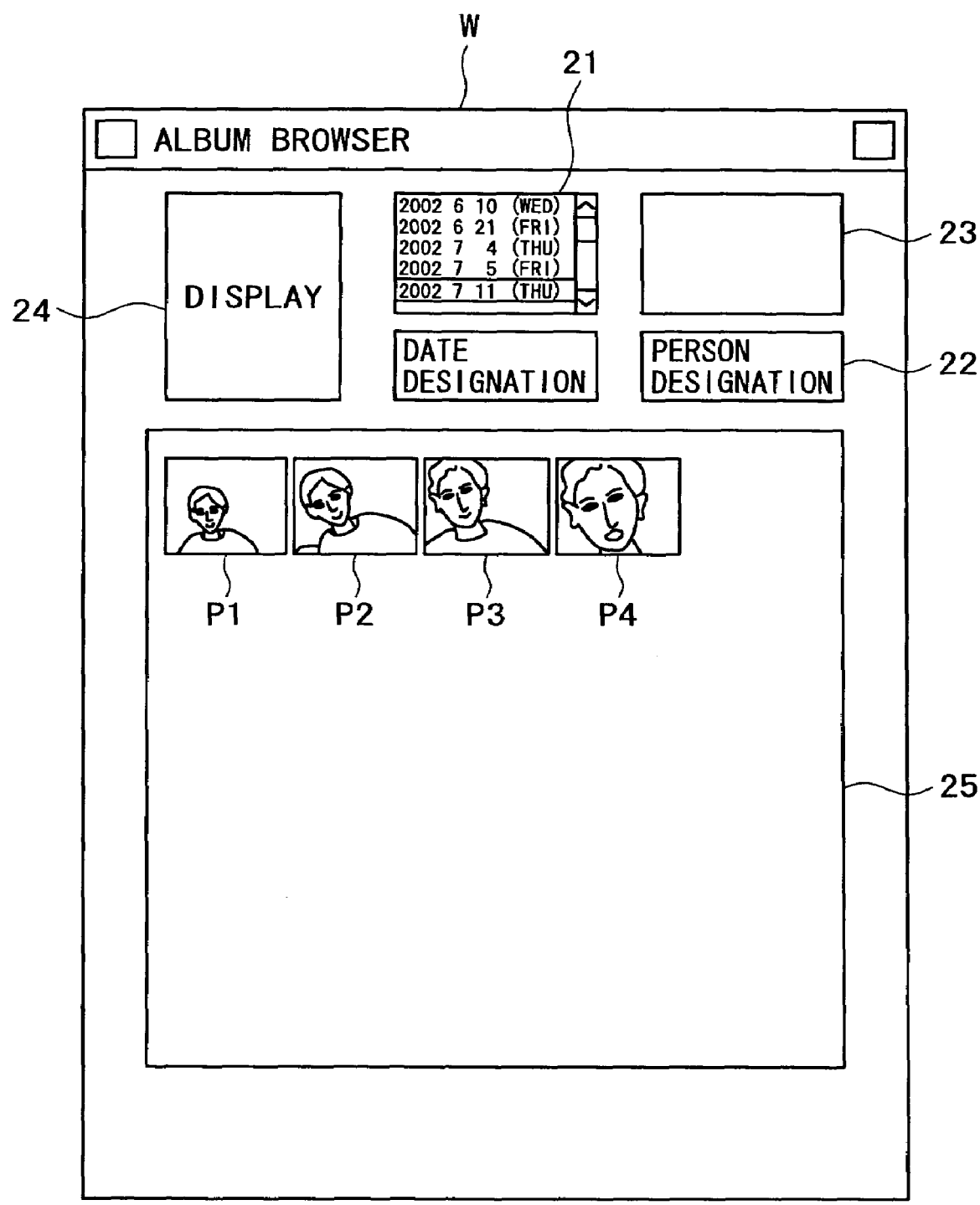
FIG. 6 shows an example displayed on a GUI screen for an album browsing process.

In the album browsing process, an album browsing window W shown in FIG. 6 is generated and displayed on the external monitor M. In this album browsing window W, the face image data stored in the album folder of the HDD 4 are displayed as indexes (thumbnails). It has another function of attaching a picture frame to the face image data selected from the displayed indexes and displaying the framed face image data as one picture on the screen.

For example, if a date designation button 20 in the album browsing window W is clicked by manipulating the mouse, a list of the shooting dates corresponding to the entire image data stored in the album folder of the HDD 4 are displayed in a date list window 21.

Meanwhile, if a person designation button 22 in the album browsing window W is clicked by manipulating the mouse, a list of the person recognition ID (e.g., 001, 002, 003, etc.) corresponding to the entire face image data stored in the album folder of the HDD 4 are displayed in a person list window 23.

If a display button 24 is clicked by manipulating the mouse after designating, by manipulation of the mouse, any dates displayed in the date list window 21 or designating any person recognition ID displayed in the person list window 23, then the face image data corresponding to the relevant dates or persons are read out from the HDD 4 and then are displayed as index images P1, P2, P3, P4 and so forth in a thumbnail display area 25.

Further, if any desired image is clicked and designated by manipulating the mouse out of the entire index images P1, P2, P3, P4 and so forth displayed for browsing in the thumbnail display area 25, then the selected face image data is displayed as a picture with a frame.

Figure 12A:
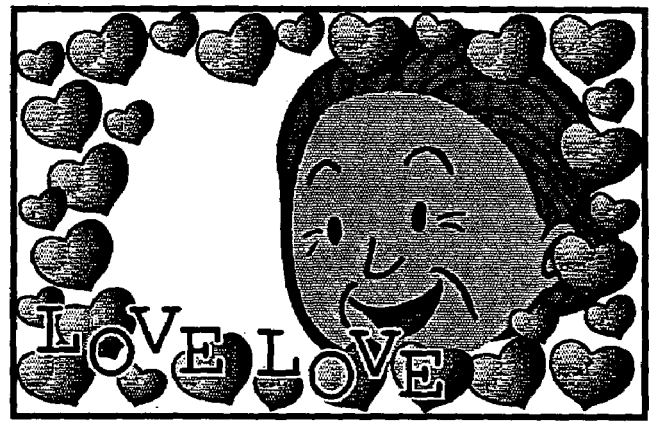
FIGS. 12A and 12B are diagrams each showing an example of a frame attached to face image data displayed on a screen in the album browsing process.
Figure 12B:
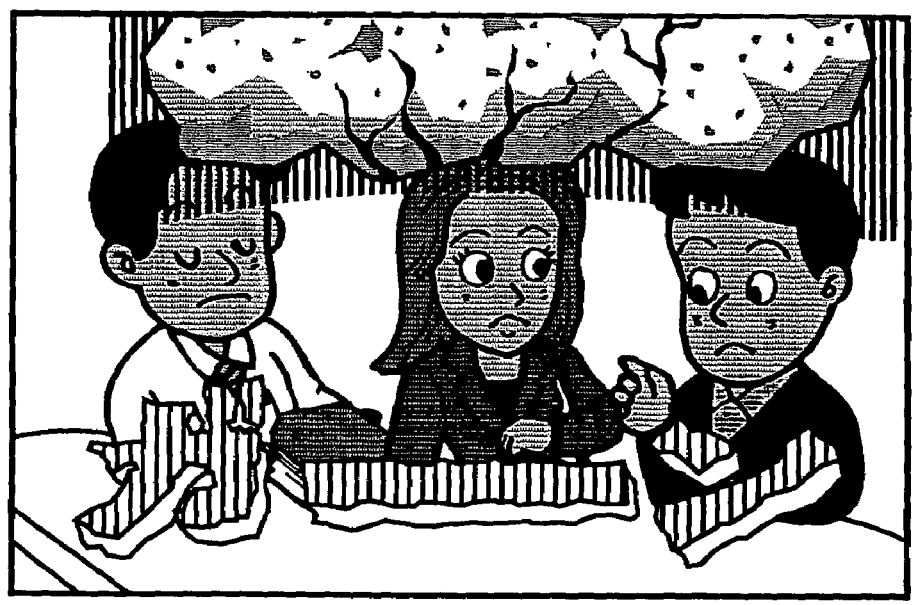

In this case, the familiarity of the relevant person is retrieved from the familiarity database FDB on the basis of the recognition ID of the face image data being displayed on the screen, and a picture frame corresponding to the retrieved familiarity is selected. For example, when the face image data of a high-familiarity person is to be displayed on the screen, a gorgeous frame is given as shown in FIG. 12A. Meanwhile, when the image data of a low-familiarity person is to be displayed on the screen, a plain frame is given as shown in FIG. 12B, whereby some sort of entertainment is offered.

[2] Operation for Database Selection

Figure 7:
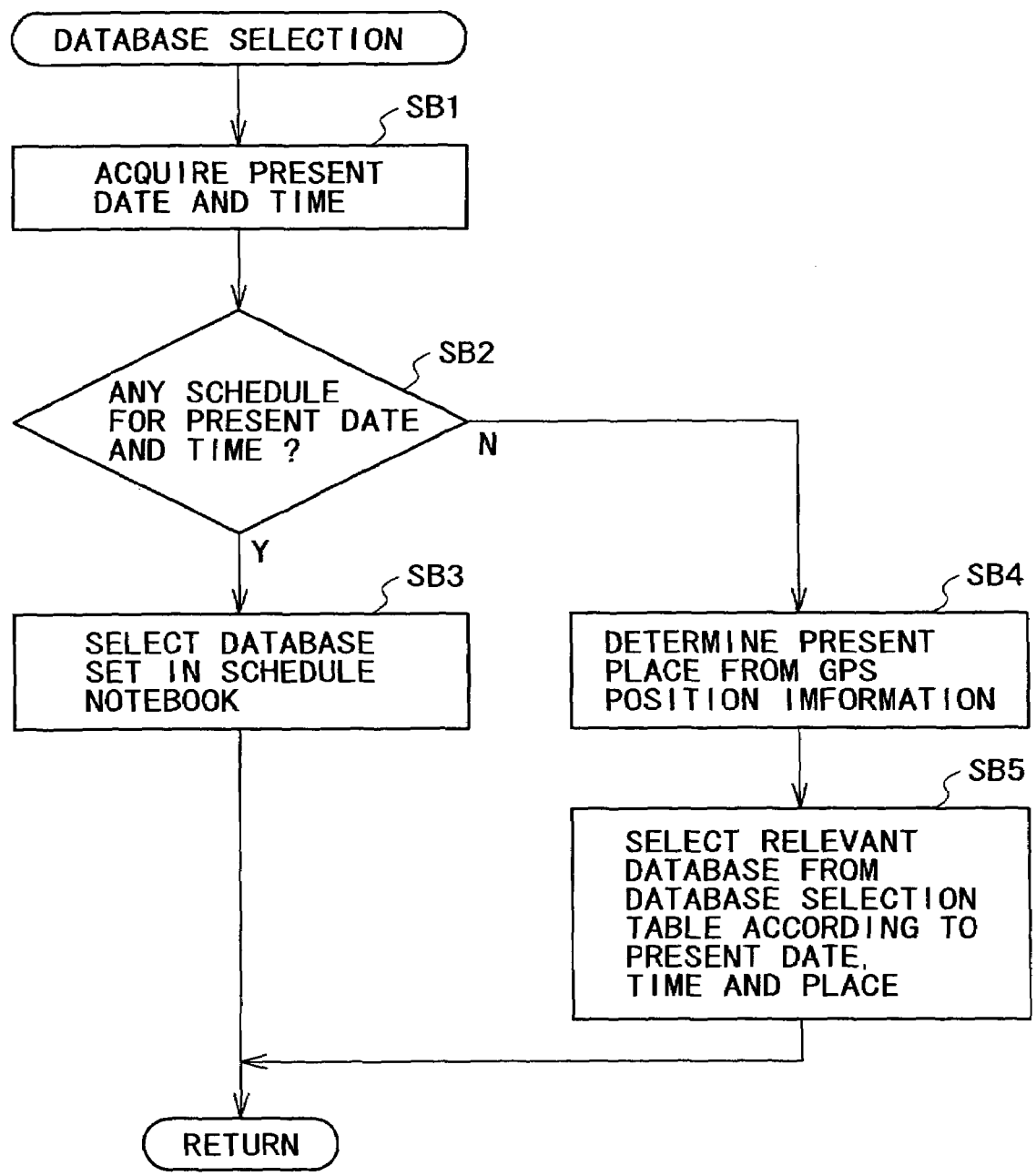
FIG. 7 is a flowchart showing the operation in a database selection process.

Next, the operation for a process of database selection will be described below with reference to FIG. 7. When this process is executed through the aforementioned step SA6, the operation of the face recognition apparatus 20 proceeds to step SB1 shown in FIG. 7, where the present date and time data are acquired from the OS program being at work. Subsequently the operation proceeds to step SB2, where a decision is made as to whether any schedule corresponding to the present date and time is existent or not. That is, a decision is made as to whether any schedule corresponding to the present date and time is registered or not in the schedule notebook (schedule managing software) being at work as resident software.

And in case any schedule corresponding to the present date and time is registered, the result of the above decision becomes "YES", so that the operation proceeds to step SB3 to select the image database which corresponds to the database designation value set in the schedule notebook.

Meanwhile, in case any schedule corresponding to the present date and time is not registered in the schedule notebook, the result of the decision at step SB2 becomes "NO", so that the operation proceeds to step SB4. Then at step SB4, the present place is determined from the GPS position information generated by the position detector 8. In a state where the GPS signal fails to be received and the present place cannot be specified, the present place is determined on the basis of the GPS position information at the time point when the GPS signal has been lost (e.g., when the user has entered indoors).

Subsequently at step SB5, the relevant image database is selected from the aforementioned database select table DST in accordance with the present date and time and the present position of the user, whereby the image database of the attribute optimal to the face recognition scene is selected. More concretely, the image database IDB1 is selected if, for example, the date and time are a weekday and daytime respectively and the place is the company, or the image database IDB2 is selected in case the date and time are on Saturday or Sunday and the place is not specified in particular.

[3] Operation for Person Registration

Figure 8:
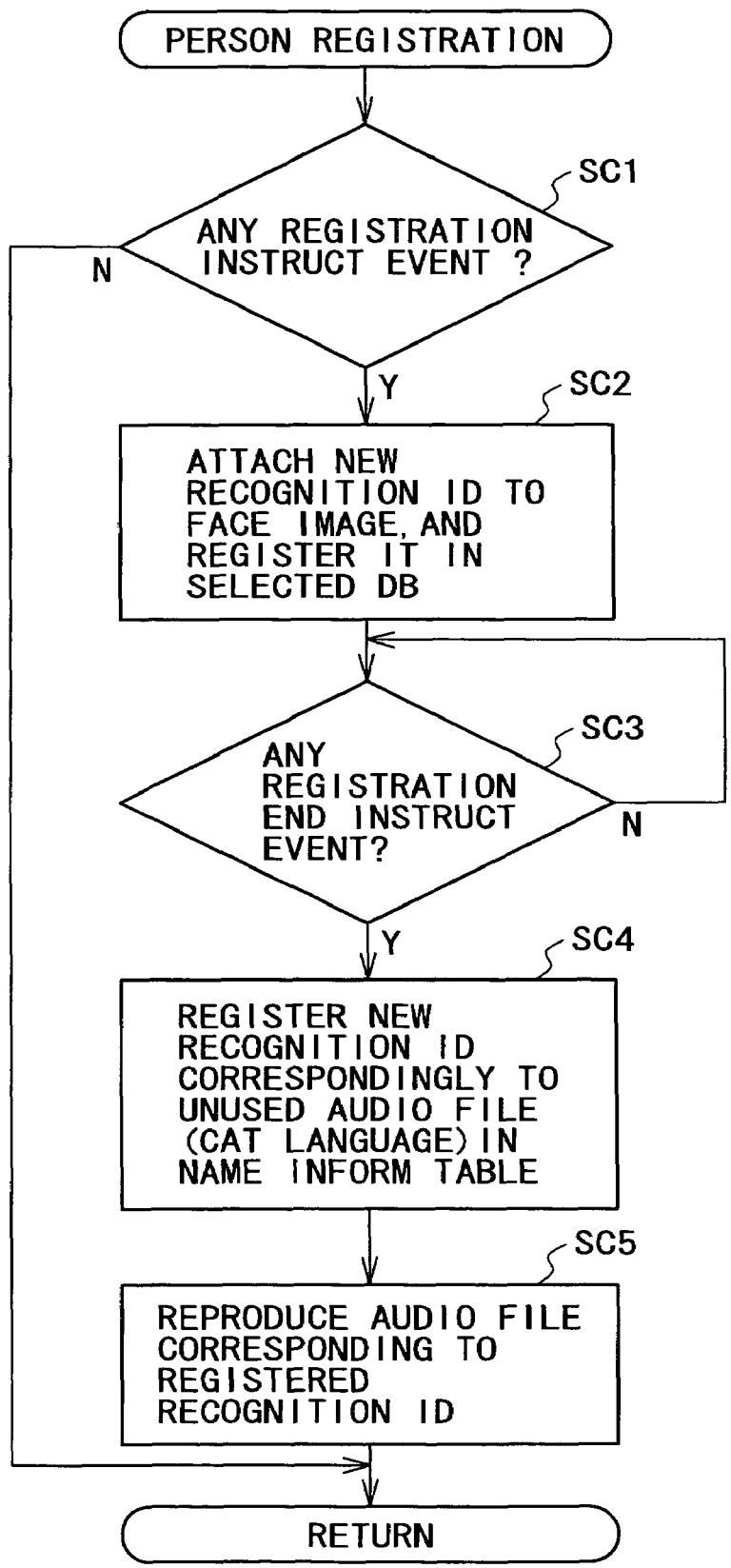
FIG. 8 is a flowchart showing the operation in a person registration process.

Now the operation for a process of person registration will be described below with reference to FIG. 8. When this process is executed through the aforementioned step SA7, the operation of the face recognition apparatus 20 proceeds to step SC1 shown in FIG. 8, where a decision is made as to whether a registration instruct event is existent or not. And if a registration instruct event is not existent, the result of this decision becomes "NO", so that no process is executed, and the operation returns to the main routine (see FIG. 3).

Meanwhile, when the user has clicked the right button of the mouse 6 provided in the right hand RH of the stuffed toy 100 to thereby generate a registration instruct event, the result of the above decision becomes "YES", so that the operation proceeds to next step SC2. Then at step SC2, a new recognition ID is attached to the face image data obtained by the shooting at step SA5 of the main routine, and the face image data thus processed is registered newly in the image database selected by the aforementioned process of database selection.

Subsequently at step SC3, the apparatus stands by until generation of a registration end instruct event. And when the user has clicked again the right button of the mouse 6 provided in the right hand RH of the stuffed toy 100 to thereby generate a registration end instruct event, the result of a decision at this step becomes "YES", so that the operation proceeds to step SC4.

At step SC4, a new recognition ID is attached correspondingly to an unused audio file in the name inform table NIT, and then the audio file is registered. Thereafter at step SC5, the audio file with such new recognition ID is reproduced, whereby the user is notified of the content of the audio file (e.g., a cat's voice such as mew) that indicates the name of the person registered newly in the image database.

[4] Operation for Name Informing Process

Figure 9:
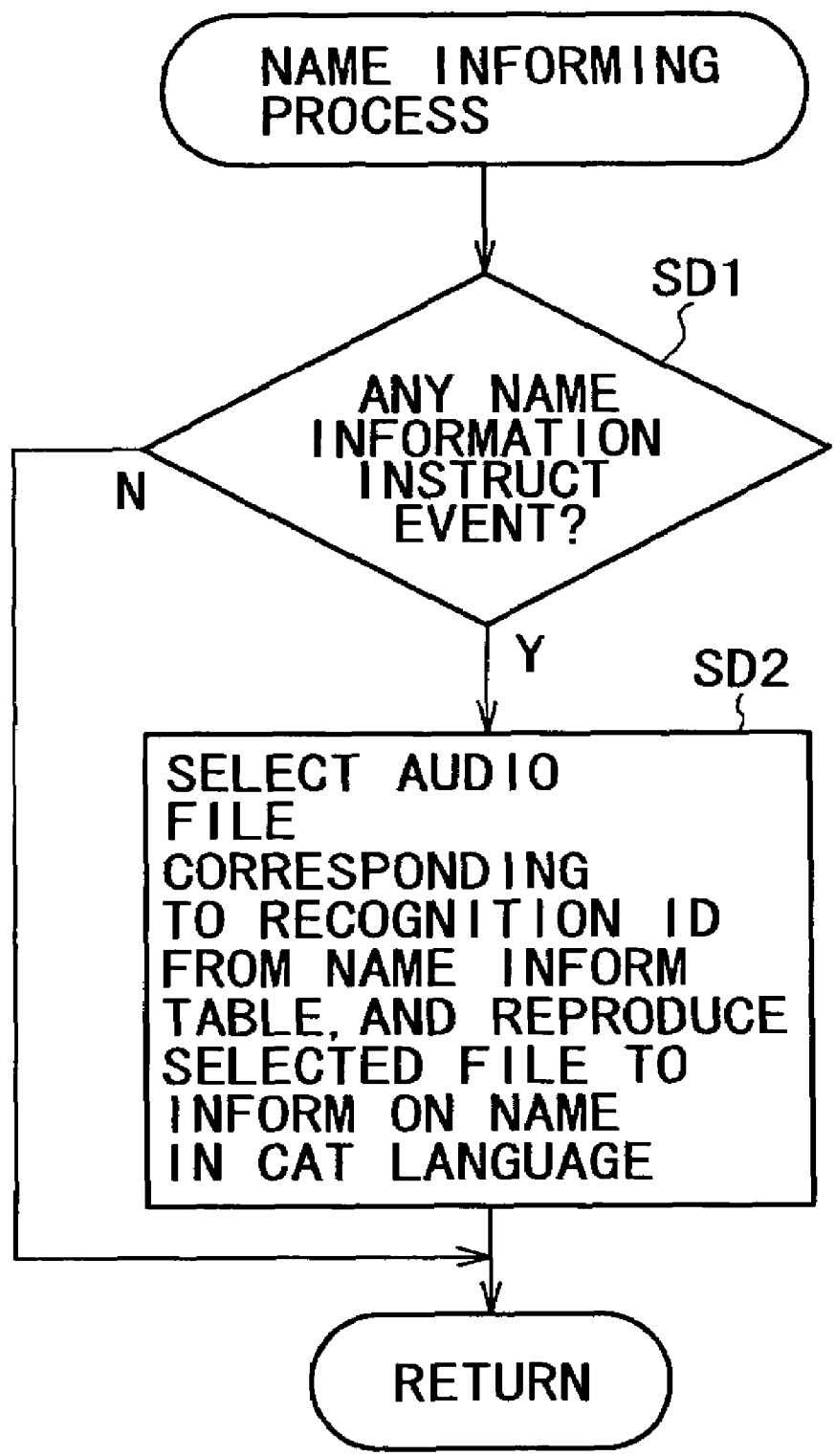
FIG. 9 is a flowchart showing the operation in a name informing process.

Next, the operation for a name informing process will be described below with reference to FIG. 9. When this process is executed through the aforementioned step SA10, the operation of the face recognition apparatus 20 proceeds to step SD1 shown in FIG. 9, where a decision is made as to whether a name information instruct event is existent or not. And if a name information instruct event is not existent, the result of this decision becomes "NO", so that no process is executed, and the operation returns to the main routine (see FIG. 5).

Meanwhile, when the user has clicked the left button of the mouse 6 provided in the right hand RH of the stuffed toy 100 to thereby generate a name information instruct event, the result of the above decision becomes "YES", so that the operation proceeds to step SD2, where the audio file corresponding to the recognition ID of the person identified by the face recognition is selected with reference to the name information table NIT, and then the selected audio file is reproduced. Thus, the stuffed toy 100 informs, in a cat language (mew voice), the name of the person identified by the face recognition.

According to this embodiment, as described above, there are provided a plurality of image databases which contain the registered face images of persons included in a plurality of attributes corresponding to the situations of face recognition, i.e., classified attributes such as dates and times or places that represent the human relationship of the user both officially and privately, and the image database of the attribute optimal to the scene of the face recognition is selected from such image databases, and the relevant person is identified by discriminatively recognizing the face in the shot image scene with reference to the selected image database.

Therefore, even in case the persons registered in the databases are many, since the image databases are subdivided in accordance with the attributes, the number of persons registered in each image database can be optimized, and the face recognition is performed by selecting the image database of the attribute optimal to the face recognition scene, hence achieving an enhancement in the recognition rate.

(5) Modifications

In the embodiment mentioned, the person in the shot image scene is identified by means of the face recognition apparatus 20 incorporated in the stuffed toy 100, and the name of the identified person is informed. However, the spirit of the present invention is not limited to such embodiment alone, and it may be altered into a variety of modifications.

Figure 10:
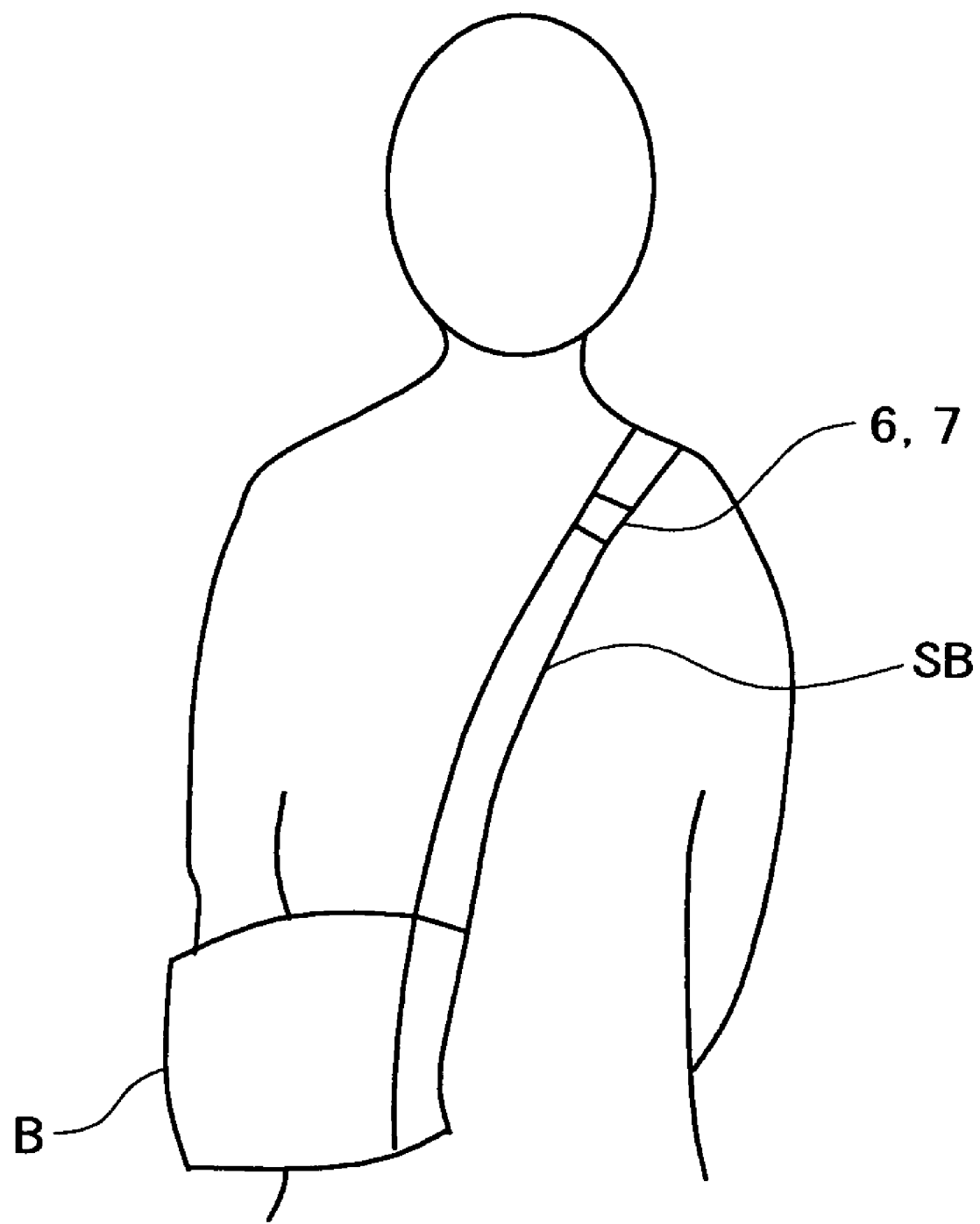
FIG. 10 illustrates an exemplary modification.

For example, as shown in FIG. 10, the main body of the face recognition apparatus 20 may be incorporated in a shoulder bag B instead of the stuffed toy 100, and the mouse 6 and the CCD camera 7 may be disposed in a shoulder belt SB of the bag.

In this embodiment of the invention, one image database optimal to the face recognition scene is selected in accordance with the date and time or the place. However, in addition thereto, it is also possible to produce an image database optimal to the face recognition scene by using the aforementioned familiarity database FDB (see FIG. 4).

That is, the recognition ID of the person having the familiarity corresponding to the size of the face region is retrieved from the familiarity database FDB on the basis of the size of the face region obtained at detection of the face, then a new image database is produced by extracting, from the individual image database, the registered face image data corresponding to the retrieved recognition ID, and the face may be recognized by the use of such new image database. Thus, the face recognition is performed while limiting to the person who has the familiarity corresponding to the size of the image region detected from the shot image, hence enhancing the recognition rate.

It is also to be noted that the embodiment mentioned above represents a mere example of specifying an individual person from his or her face. And the present invention may further be applied to an image recognition apparatus which, for example, shoots a logo mark put up in a store or the like, and specifies the name of the store or a public corporation from the shot image of the logo mark or the like. In this case, the apparatus may be so contrived as to automatically select one image database of the attribute corresponding to the relevant situation such as date and time of each recognition or familiarity to the image of an object logo mark, wherein the store name, corporation or the like can be specified from the shot image of the logo mark while referring to the reference image stored in the selected image database of the attribute corresponding thereto.

Moreover, the spirit of the present invention is not restricted to the above embodiment alone, and it may be applicable also to a cellular phone equipped with a shooting function and a GPS position detecting function, and further to a portable terminal equipped with a shooting function, a GPS position detecting function and a radio communication function. In this case, since most of cellular phones or portable terminals are not sufficient in the computing capability of the CPU therein, a modification may be so contrived that the image shot at the terminal and the shooting position are sent to a server which performs face recognition via a network, and the result of the face recognition obtained on the server side is sent back to the terminal.

And according to the present invention, when any individual person or public corporation for example is to be specified from the object image obtained by shooting the person or a logo mark put up in a store or the like, one image database of the attribute corresponding to the situation of recognition such as date, time or place, or familiarity to the object image is selected automatically, and then the person or corporation is specified from the shot image while referring to the reference images stored in the image database of the selected attribute, and specified. Therefore, even in case the sum of the reference images registered in the image databases is increased, since the image databases are subdivided and classified in accordance with the attributes, the number of the reference images registered in each image database corresponding to one attribute can be reduced, and further the image database of the optimal attribute can be selected automatically in conformity to the situation of recognition such as date, time, place or familiarity. Consequently, the number of the reference images can be minimized without the necessity of any intentional manipulation for selection by the user, and the reference images are narrowed down due to the additional information of the situation, thereby attaining a further enhancement of the recognition rate.

What is claimed is:

1. An image recognition apparatus comprising:
    shooting means for shooting an object image to be discriminatively recognized and identified;
    a plurality of attribute-classified image database means classified respectively in accordance with a plurality of attributes corresponding to various situations of the shooting performed by said shooting means, and storing therein at least one reference image classified by the attributes and also storing recognition ID attached uniquely to the at least one reference image respectively;
    selection means for selecting, from the plurality of attribute-classified image database means, one image database means of the attribute corresponding to a face recognition presently recognized; and
    object specifying means for specifying the recognition ID, which corresponds to the object image shot by said shooting means, with reference to the at least one reference image stored in the attribute-classified image database means selected by said selection means.

2. The image recognition apparatus according to claim 1, further comprising:
    date-and-time count means for counting a present date and time;
    wherein said attribute-classified image database means are classified by attributes depending on a time shot by said shooting means; and
    wherein said selection means automatically selects, on a basis of the present date and time counted by said date-and-time count means, one attribute-classified image database means corresponding to the present date and time from said plurality of attribute-classified image database means.

3. The image recognition apparatus according to claim 1, further comprising:
    position measuring means for measuring a present position, of an object,
    wherein said attribute-classified image database means are classified by attributes depending on a position shot by said shooting means; and
    said selection means automatically selects, on a basis of the present position measured by said position measuring means, one attribute-classified image database means corresponding to the present position from said plurality of attribute-classified image database means.

4. The image recognition apparatus according to claim 1, further comprising:
    date-and-time count means for counting a present date and time, and
    position measuring means for measuring a present position of an object;
    wherein said attribute-classified image database means are classified by attributes depending on the time and the position shot by said shooting means; and
    said selection means automatically selects, on a basis of the present date and time counted by said date-and-time count means and also the present position measured by said position measuring means, one attribute-classified image database means corresponding to the present date and time and the present position from said plurality of attribute-classified image database means.

5. The image recognition apparatus according to claim 1, further comprising:
    estimation means for estimating familiarity to the object image on a basis of an occupancy area ratio of the object image to an entire region shot by said shooting means, or on a basis of a number of times of specifying the object image by said object specifying means in the past, or on a basis of a combination of said occupancy area ratio and said number of times;
    wherein said attribute-classified image database means are classified by attributes depending on a familiarity to the object image estimated by said estimation means; and
    said selection means automatically selects, on a basis of the familiarity estimated by said estimation means, one attribute-classified image database means corresponding to the familiarity to the object image shot by said shooting means at present, from said plurality of attribute-classified image database means.

6. The image recognition apparatus according to claim 5, further comprising:
    date-and-time count means for counting a present date and time,
    wherein said attribute-classified image database means are classified by attributes depending on a familiarity to the object image estimated by said estimation means, and also by attributes depending on a time shot by said shooting means; and
    said selection means automatically selects, on a basis of the familiarity estimated by said estimation means and the present date and time counted by said date-and-time count means, one attribute-classified image database means corresponding to the familiarity to the object image shot by said shooting means at present and also corresponding to the present date and time, from said plurality of attribute-classified image database means.

7. The image recognition apparatus according to claim 5, further comprising:
position measuring means for measuring a present position of an object,
wherein said attribute-classified image database means are classified by attributes depending on a familiarity to the object image estimated by said estimation means, and also by attributes depending on a position shot by said shooting means;
and said selection means automatically selects, on a basis of the familiarity estimated by said estimation means and the present position measured by said position measuring means, one attribute-classified image database means corresponding to the familiarity to the object image shot by said shooting means at present and also corresponding to the present position, from said plurality of attribute-classified image database means.

8. The image recognition apparatus according to claim 5, further comprising:
date-and-time count means for counting a present date and time, and
position measuring means for measuring a present position of an object;
wherein said attribute-classified image database means are classified by attributes depending on a familiarity to the object image estimated by said estimation means, and also by attributes depending on the time and the position shot by said shooting means; and
said selection means automatically selects, on a basis of the familiarity estimated by said estimation means, the present date and time counted by said date-and-time count means, and also the present position measured by said position measuring means, one attribute-classified image database means corresponding to the familiarity to the object image shot by said shooting means at present, the present date and time, and also corresponding to the present position, from said plurality of attribute-classified image database means.

9. An image recognition processing method comprising:
a selection step of selecting one attribute-classified image database corresponding to a present situation from a plurality of attribute-classified image databases classified respectively in accordance with a plurality of attributes corresponding to various situations of a shooting performed by a shooting means in respect of an object image to be discriminatively recognized and identified, and storing therein at least one reference image classified by the at least one attribute and also storing recognition ID attached uniquely to the at least one reference image respectively; and
an object specifying step of specifying the recognition ID, which corresponds to the object image shot by said shooting means, with reference to the at least one reference image stored in the attribute-classified image database selected at said selection step.

10. The image recognition processing method according to claim 9, further comprising:
a date-and-time count step of counting a present date and time;
wherein said attribute-classified image databases are classified by attributes depending on a time shot by said shooting means; and at said selection step, one attribute-classified image database corresponding to the present date and time is selected automatically from said plurality of attribute-classified image databases on a basis of the present date and time counted at said date-and-time count step.

11. The image recognition processing method according to claim 9, further comprising:
a position measuring step of measuring a present position of an object,
wherein said attribute-classified image databases are classified by attributes depending on a position shot by said shooting means; and at said selection step, one attribute-classified image database corresponding to the present position is selected automatically from said plurality of attribute-classified image databases on a basis of the present position measured at said position measuring step.

12. The image recognition processing method according to claim 9, further comprising:
a date-and-time count step of counting a present date and time, and a position measuring step of measuring a present position of an object;
wherein said attribute-classified image databases are classified by attributes depending on the time and a position shot by said shooting means; and at said selection step, one attribute-classified image database corresponding to the present date and time and the present position is selected automatically from said plurality of attribute-classified image databases on a basis of the present date and time counted by said date-and-time count step and also the present position measured by said position measuring step.

13. The image recognition processing method according to claim 9, further comprising:
an estimation step of estimating familiarity to the object image on a basis of a occupancy area ratio of the object image to an entire region shot by said shooting means, or on a basis of a number of times of specifying the object image at said object specifying step in the past, or on a basis of a combination of said occupancy area ratio and said number of times;
wherein said attribute-classified image databases are classified by attributes depending on the familiarity to the object image estimated at said estimation step; and at said selection step, one attribute-classified image database corresponding to the familiarity to the object image shot by said shooting means at present is selected automatically from said plurality of attribute-classified image databases on a basis of the familiarity estimated by said estimation means.

14. The image recognition processing method according to claim 13, further comprising:
a date-and-time count step of counting a present date and time,
wherein said attribute-classified image databases are classified by attributes depending on the familiarity to the object image estimated by said estimation means, and also by attributes depending on a time shot by said shooting means; and at said selection step, one attribute-classified image database, which corresponds to the familiarity to the object image shot by said shooting means at present and also corresponds to the present date and time, is selected automatically from said plurality of attribute-classified databases on a basis of the familiarity estimated at said estimation step and the present date and time counted at said date-and-time count step.

15. The image recognition processing method according to claim 13, further comprising:
a position measuring step of measuring a present position of an object,
wherein said attribute-classified image databases are classified by attributes depending on the familiarity to the object image estimated at by said estimation step, and also by attributes depending on the position shot by said shooting means; and at said selection step, one attribute-classified image database, which corresponds to the familiarity to the object image shot by said shooting means at present and also corresponds to the present position, is selected automatically from said plurality of attribute-classified image databases on a basis of the familiarity estimated at said estimation step and the present position measured at said position measuring step.

16. The image recognition processing method according to claim 13, further comprising:
a date-and-time count step of counting a present date and time, and
a position measuring step of measuring the present position;
wherein said attribute-classified image databases are classified by attributes depending on the familiarity to the object image estimated by said estimation means, and also by attributes depending on a time and a position shot by said shooting means; and at said selection step, one attribute-classified image database, which corresponds to the familiarity to the object image shot by said shooting means at present, the present date and time, and also corresponds to the present position, is selected automatically from said plurality of attribute-classified image databases on a basis of the familiarity estimated at said estimation step, the present date and time counted at said date-and-time count step, and also the present position measured at said position measuring step.

17. A computer readable medium encoded with a computer program configured to cause an information processing apparatus to execute a method, the method comprising:
a selection step of selecting one attribute-classified image database corresponding to a present situation from a plurality of attribute-classified image databases specified respectively in accordance with a plurality of attributes corresponding to various situations of a shooting performed by a shooting means in respect of an object image to be discriminatively recognized and identified, and storing therein at least one reference image classified by the attributes and also storing recognition ID attached uniquely to the at least one reference image respectively; and
an object specifying step of specifying the recognition ID, which corresponds to the object image shot by said shooting means, with reference to the at least one reference image stored in the attribute-classified image database selected at said selection step.

18. The image recognition program according to claim 17, further comprising:
a date-and-time count step of counting a present date and time;
wherein said attribute-classified image databases are classified by attributes depending on a time shot by said shooting means; and at said selection step, one attribute-classified image database corresponding to the present date and time is selected automatically from said plurality of attribute-classified image databases on a basis of the present date and time counted at said date-and-time count step.

19. The image recognition program according to claim 17, further comprising:
a position measuring step of measuring a present position of an object,
wherein said attribute-classified image databases are classified by attributes depending on a position shot by said shooting means; and at said selection step, one attribute-classified image database corresponding to a present position is selected automatically from said plurality of attribute-classified image databases on a basis of the present position measured at said position measuring step.

20. The image recognition program according to claim 17, further comprising:
a date-and-time count step of counting a present date and time, and a position measuring step of measuring a present position of an object;
wherein said attribute-classified image databases are classified by attributes depending on a time and a position shot by said shooting means; and at said selection step, one attribute-classified image database corresponding to the present date and time and the present position is selected automatically from said plurality of attribute-classified image databases on a basis of the present date and time counted by said date-and-time count means and also the present position measured by said position measuring means.

21. The image recognition program according to claim 17, further comprising:
an estimation step of estimating a familiarity to the object image on a basis of an occupancy area ratio of the object image to an entire region shot by said shooting means, or on a basis of a number of times of specifying the object image at said object specifying step in the past, or on a basis of a combination of said occupancy area ratio and said number of times;
wherein said attribute-classified image databases are classified by attributes depending on the familiarity to the object image estimated at said estimation step; and at said selection step, one attribute-classified image database corresponding to the familiarity to the object image shot by said shooting means at present is selected automatically from said plurality of attribute-classified image databases on a basis of the familiarity estimated by said estimation means.

22. The image recognition program according to claim 21, further comprising:
a date-and-time count step of counting a present date and time,
wherein said attribute-classified image databases are classified by attributes depending on the familiarity to the object image estimated by said estimation means, and also by attributes depending on a time shot by said shooting means; and at said selection step, one attribute-classified image database, which corresponds to the familiarity to the object image shot by said shooting means at present and also corresponds to the present date and time, is selected automatically from said plurality of attribute-classified databases on a basis of the familiarity estimated at said estimation step and the present date and time counted at said date-and-time count step.

23. The image recognition program according to claim 21, further comprising:

a position measuring step of measuring a present position of an object, wherein said attribute-classified image databases are classified by attributes depending on the familiarity to the object image estimated at by said estimation step, and also by attributes depending on the position shot by said shooting means; and at said selection step, one attribute-classified image database, which corresponds to the familiarity to the object image shot by said shooting means at present and also corresponds to the present position, is selected automatically from said plurality of attribute-classified image databases on a basis of the familiarity estimated at said estimation step and the present position measured at said position measuring step.

24. The image recognition processing method according to claim 21, further comprising:

a date-and-time count step of counting a present date and time, and a position measuring step of measuring a present position of an object;

wherein said attribute-classified image databases are classified by attributes depending on a familiarity to the object image estimated by said estimation means, and also by attributes depending on a time and a position shot by said shooting means; and at said selection step, one attribute-classified image database, which corresponds to the familiarity to the object image shot by said shooting means at present, the present date and time, and also corresponds to the present position, is selected automatically from said plurality of attribute-classified image databases on a basis of the familiarity estimated at said estimation step, the present date and time counted at said date-and-time count step, and also the present position measured at said position measuring step.

25. An image recognition apparatus comprising:

an image capture device configured to capture an object image to be discriminatively recognized and identified;

a plurality of attribute-classified image storage devices configured to store classified respectively in accordance with a plurality of attributes corresponding to various situations of the image capture devices, and storing therein at least one reference image classified by the attributes and also storing recognition ID attached uniquely to the at least one reference image respectively;

a selector configured to select, from the plurality of attribute-classified image storage devices, one image storage device of the attribute corresponding to a face recognition presently recognized; and an object specifying device configured to specify the recognition ID, which corresponds to the object image captured by said capture device, with reference to the at least one reference image stored in the attribute-classified image storage device selected by said selector.

* * * * *